United States Patent
Chang et al.

(10) Patent No.: US 12,356,464 B2
(45) Date of Patent: Jul. 8, 2025

(54) METHOD AND USER EQUIPMENT FOR PERFORMING UPLINK REPETITIONS AND RELATED BASE STATION

(71) Applicant: SHARP KABUSHIKI KAISHA, Sakai (JP)

(72) Inventors: Tzu-Wen Chang, Taipei (TW); Chie-Ming Chou, Taipei (TW); Chia-Hung Wei, Taipei (TW); Hai-Han Wang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 375 days.

(21) Appl. No.: 18/116,476

(22) Filed: Mar. 2, 2023

(65) Prior Publication Data

US 2023/0292373 A1   Sep. 14, 2023

Related U.S. Application Data

(60) Provisional application No. 63/269,024, filed on Mar. 8, 2022.

(51) Int. Cl.
| | |
|---|---|
| *H04W 74/08* | (2024.01) |
| *H04W 24/08* | (2009.01) |
| *H04W 24/10* | (2009.01) |
| *H04W 74/0833* | (2024.01) |

(52) U.S. Cl.
CPC ....... *H04W 74/0833* (2013.01); *H04W 24/08* (2013.01); *H04W 24/10* (2013.01)

(58) Field of Classification Search
CPC ............. H04W 74/0833; H04W 24/08; H04W 74/083; H04W 28/026; H04W 28/027; H04L 5/0051; H04L 5/005
See application file for complete search history.

(56) References Cited

U.S. PATENT DOCUMENTS

| | | | | |
|---|---|---|---|---|
| 11,665,767 | B2 * | 5/2023 | Matsumura | H04B 7/0695 370/329 |
| 2011/0243066 | A1 * | 10/2011 | Nayeb Nazar | H04L 5/0055 370/328 |
| 2023/0309148 | A1 * | 9/2023 | Wei | H04L 5/0053 |

* cited by examiner

*Primary Examiner* — Wei Zhao
(74) *Attorney, Agent, or Firm* — ScienBiziP, P.C.

(57) ABSTRACT

A method and a User Equipment (UE) for performing uplink repetitions and a related base station (BS) are provided. The method includes a UE receiving a Reference Signal Received Power (RSRP) threshold from a Base Station (BS); initiating a 4-step Random Access (RA) procedure; performing a Downlink (DL) Reference Signal (RS) measurement to obtain an RSRP measurement result; and performing a Message 1 (Msg1) repetition operation and a Message 3 (Msg3) repetition request operation within the 4-step RA procedure after determining that the RSRP measurement result is equal to or less than the RSRP threshold.

21 Claims, 10 Drawing Sheets

METHOD AND USER EQUIPMENT FOR PERFORMING UPLINK REPETITIONS AND RELATED BASE STATION

CROSS-REFERENCE TO RELATED APPLICATION(S)

The present disclosure claims the benefit of and priority to U.S. Provisional Patent Application Ser. No. 63/269,024, filed on Mar. 8, 2022, entitled "DETERMINATION OF MULTIPLE PRACH TRANSMISSIONS AND MSG3 REPETITION," the content of which is hereby incorporated fully by reference into the present disclosure for all purposes.

FIELD

The present disclosure generally relates to wireless communication and, more particularly, to a method and a User Equipment (UE) for performing uplink repetitions and a related Base Station (BS).

BACKGROUND

With the tremendous growth in the number of connected devices and the rapid increase in user/network traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize network services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in next-generation wireless communication systems.

SUMMARY

At least some of the acronyms in the present application are defined as follows and, unless otherwise specified, the acronyms have the following meanings:

| Acronym | Full name |
| --- | --- |
| 3GPP | 3rd Generation Partnership Project |
| 5G | 5th Generation |
| 5GC | 5G Core |
| AM | Acknowledge Mode |
| AS | Access Stratum |
| BA | Bandwidth Aggregation |
| BFR | Beam Failure Recovery |
| BS | Base Station |
| BSR | Buffer Status Reporting |
| BWP | Band Width Part |
| CA | Carrier Aggregation |
| CBRA | Contention-Based Random Access |
| CC | Component Carriers |
| CCCH | Common Control Channel |
| CE | Control Element |
| CFRA | Contention-Free Random Access |
| CG | Cell Group |
| CORESET | Control Resource Set |
| CRC | Cyclic Redundancy Check |
| C-RNTI | Cell Radio Network Temporary Identifier |
| CS-RNTI | Configured Scheduling Radio Network Temporary Identifier |
| CSI | Channel State Information |
| CSI-RS | Channel State Information Reference Signal |
| CQI | Channel Quality Indicator |
| DC | Dual Connectivity |
| DCI | Downlink Control Information |
| DL | Downlink |
| DL-SCH | Downlink Shared Channel |
| DMRS | Demodulation Reference Signal |
| DTCH | Dedicated Traffic Channel |
| DRB | Data Radio Bearer |
| eMBB | Enhanced Mobile Broadband |
| EN-DC | E-UTRA NR Dual Connectivity |
| gNB | Next-Generation Node B |
| HO | Handover |
| IE | Information Element |
| L1 | Layer 1 |
| L2 | Layer 2 |
| LCH | Logical Channel |
| LCID | Logical Channel Identity |
| LTE | Long-Term Evolution |
| M3R | Message-3 Repetitions |
| MAC | Medium Access Control |
| MCG | Master Cell Group |
| MCS-C-RNTI | Modulation Coding Scheme Cell Radio Network Temporary Identifier |
| MIMO | Multi-Input Multi-Output |
| mMTC | massive Machine Type Communications |
| MSG0 | Message-0 |
| Msg1 | Message-1 |
| Msg2 | Message-2 |
| Msg3 | Message-3 |
| Msg4 | Message-4 |
| MsgA | Message-A |
| MsgB | Message-B |
| MP | Multiple-PRACH transmissions |
| NAS | Non-Access Stratum |
| NDI | New Data Indicator |
| NG-C | Next-Generation Core |
| NR | New Radio |
| NUL | Normal Uplink |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical |
| PRACH | Physical Random Access Channel |
| PSCell | Primary SCell |
| PTRS | Phase Tracking Reference Signal |
| PUCCH | Physical Uplink Control Channel |
| PUSCH | Physical Uplink Shared Channel |
| QoS | Quality of Service |
| RA | Random Access |
| RAT | Radio Access Technology |
| RACH | Random Access Channel |
| RAR | Random Access Response |
| RedCap | Reduced Capability |
| Rel-15 | Release 15 |
| Rel-16 | Release 16 |
| Rel-17 | Release 17 |
| Rel-18 | Release 18 |
| RLC | Radio Link Control |
| RLF | Radio Link Failure |
| RNTI | Radio Network Temporary Identifier |
| RRC | Radio Resource Control |
| RRM | Radio Resource Management |
| RS | Reference Signal |
| RSRP | Reference Signal Received Power |
| RTT | Round Trip Time |
| Rx | Receiving |
| SCell | Secondary Cell |
| SCG | Secondary Cell Group |
| SDT | Small Data Transmission |

-continued

| Acronym | Full name |
| --- | --- |
| SDU | Service Data Unit |
| SFN | System Frame Number |
| SI | System Information |
| SIB | System Information Block |
| SINR | Signal to Interference and Noise Ratio |
| SLIV | Start and Length Indicator Value |
| SR | Scheduling Request |
| SRB | Signaling Radio Bearer |
| SRS | Sounding Reference Signal |
| SSB | Synchronization Signal Block |
| SS-RSRP | Synchronization Signal Reference Signal Received Power |
| SpCell | Special Cell |
| SUL | Supplementary Uplink |
| TA | Timing Advance |
| TAG | Timing Advance Group |
| TB | Transport Block |
| TAG | Timing Advance Group |
| TNL | Transport Network Layer |
| TR | Technical Report |
| TRP | Transmission/Reception Point |
| TS | Technical Specification |
| Tx | Transmitting |
| UE | User Equipment |
| UL | Uplink |
| UL-SCH | Uplink Shared Channel |
| URLLC | Ultra-Reliable and Low-Latency Communications |

The present disclosure is directed to a method and a User Equipment (UE) for performing uplink repetitions and a related Base Station (BS).

According to a first aspect of the present disclosure, a method performed by a User Equipment (UE) for performing uplink repetitions is provided. The method includes: receiving a Reference Signal Received Power (RSRP) threshold from a Base Station (BS); initiating a 4-step Random Access (RA) procedure; performing a Downlink (DL) Reference Signal (RS) measurement to obtain an RSRP measurement result; and performing a Message 1 (Msg1) repetition operation and a Message 3 (Msg3) repetition request operation within the 4-step RA procedure after determining that the RSRP measurement result is equal to or less than the RSRP threshold, wherein: the Msg1 repetition operation includes transmitting a Msg1 for the 4-step RA procedure multiple times before the UE monitors a Random Access Response (RAR) corresponding to the Msg1, and the Msg3 repetition request operation includes transmitting a Msg3 repetition request to the BS to request execution of a Msg3 repetition operation. The Msg3 repetition operation includes transmitting a Msg3 for the 4-step RA procedure multiple times in response to receiving the RAR.

In some implementations of the first aspect of the present disclosure, the method further includes receiving, from the BS, an indication that the UE is permitted to determine whether to perform both the Msg1 repetition operation and the Msg3 repetition request operation within the 4-step RA procedure according to a comparison of the RSRP threshold and the RSRP measurement result.

In some implementations of the first aspect of the present disclosure, the RSRP threshold is configured for the UE to determine whether to perform the Msg1 repetition operation.

In some implementations of the first aspect of the present disclosure, the RSRP threshold is configured for the UE to determine whether to perform the Msg3 repetition request operation.

In some implementations of the first aspect of the present disclosure, the RSRP threshold is configured on a per-Bandwidth-Part (BWP) basis.

In some implementations of the first aspect of the present disclosure, the RSRP threshold is configured on a per-RA-resource basis.

In some implementations of the first aspect of the present disclosure, the Msg3 repetition request is transmitted via the Msg1.

According to a second aspect of the present disclosure, a User Equipment (UE) for performing uplink repetitions is provided. The UE includes at least one processor and at least one memory coupled to the at least one processor. The at least one memory stores at least one computer-executable instruction that, when executed by the at least one processor, causes the UE to: receive a Reference Signal Received Power (RSRP) threshold from a Base Station (BS); initiate a 4-step Random Access (RA) procedure; perform a Downlink (DL) Reference Signal (RS) measurement to obtain an RSRP measurement result; and perform a Message 1 (Msg1) repetition operation and a Message 3 (Msg3) repetition request operation within the 4-step RA procedure after determining that the RSRP measurement result is equal to or less than the RSRP threshold, wherein: the Msg1 repetition operation includes transmitting a Msg1 for the 4-step RA procedure multiple times before the UE monitors a Random Access Response (RAR) corresponding to the Msg1, and the Msg3 repetition request operation includes transmitting a Msg3 repetition request to the BS to request execution of a Msg3 repetition operation. The Msg3 repetition operation includes transmitting a Msg3 for the 4-step RA procedure multiple times in response to receiving the RAR.

In some implementations of the second aspect of the present disclosure, the at least one computer-executable instruction, when executed by the at least one processor, further causes the UE to receive, from the BS, an indication that the UE is permitted to determine whether to perform both the Msg1 repetition operation and the Msg3 repetition request operation within the 4-step RA procedure according to a comparison of the RSRP threshold and the RSRP measurement result.

In some implementations of the second aspect of the present disclosure, the RSRP threshold is configured for the UE to determine whether to perform the Msg1 repetition operation.

In some implementations of the second aspect of the present disclosure, the RSRP threshold is configured for the UE to determine whether to perform the Msg3 repetition request operation.

In some implementations of the second aspect of the present disclosure, the RSRP threshold is configured on a per-Bandwidth-Part (BWP) basis.

In some implementations of the second aspect of the present disclosure, the RSRP threshold is configured on a per-RA-resource basis.

In some implementations of the second aspect of the present disclosure, the Msg3 repetition request is transmitted via the Msg1.

According to a third aspect of the present disclosure, a Base Station (BS) for communicating with a User Equipment (UE) performing uplink repetitions is provided. The BS includes at least one processor and at least one memory coupled to the at least one processor. The at least one memory stores at least one computer-executable instruction that, when executed by the at least one processor, causes the BS to: transmit a Reference Signal Received Power (RSRP) threshold to the UE; and transmit at least one Downlink (DL) Reference Signal (RS) to the UE, causing the UE to perform a DL RS measurement to obtain an RSRP measurement result and to perform a Message 1 (Msg1) repetition operation and a Message 3 (Msg3) repetition request operation within a 4-step Random Access (RA) procedure in a case that the RSRP measurement result is equal to or less than the RSRP threshold, wherein: the Msg1 repetition operation includes the UE transmitting a Msg1 for the 4-step RA procedure multiple times before monitoring a Random Access Response (RAR) corresponding to the Msg 1, and the Msg3 repetition request operation includes the UE transmitting a Msg3 repetition request to the BS to request execution of a Msg3 repetition operation. The Msg3 repetition operation includes the UE transmitting a Msg3 for the 4-step RA procedure multiple times in response to the UE receiving the RAR.

In some implementations of the third aspect of the present disclosure, the at least one computer-executable instruction, when executed by the at least one processor, further causes the BS to transmit, to the UE, an indication that the UE is permitted to determine whether to perform both the Msg1 repetition operation and the Msg3 repetition request operation within the 4-step RA procedure according to a comparison of the RSRP threshold and the RSRP measurement result.

In some implementations of the third aspect of the present disclosure, the RSRP threshold is configured for the UE to determine whether to perform the Msg1 repetition operation.

In some implementations of the third aspect of the present disclosure, the RSRP threshold is configured for the UE to determine whether to perform the Msg3 repetition request operation.

In some implementations of the third aspect of the present disclosure, the RSRP threshold is configured on a per-Bandwidth-Part (BWP) basis.

In some implementations of the third aspect of the present disclosure, the RSRP threshold is configured on a per-RA-resource basis.

In some implementations of the third aspect of the present disclosure, the at least one computer-executable instruction, when executed by the at least one processor, further causes the BS to receive the Msg3 repetition request from the UE via the Msg1.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
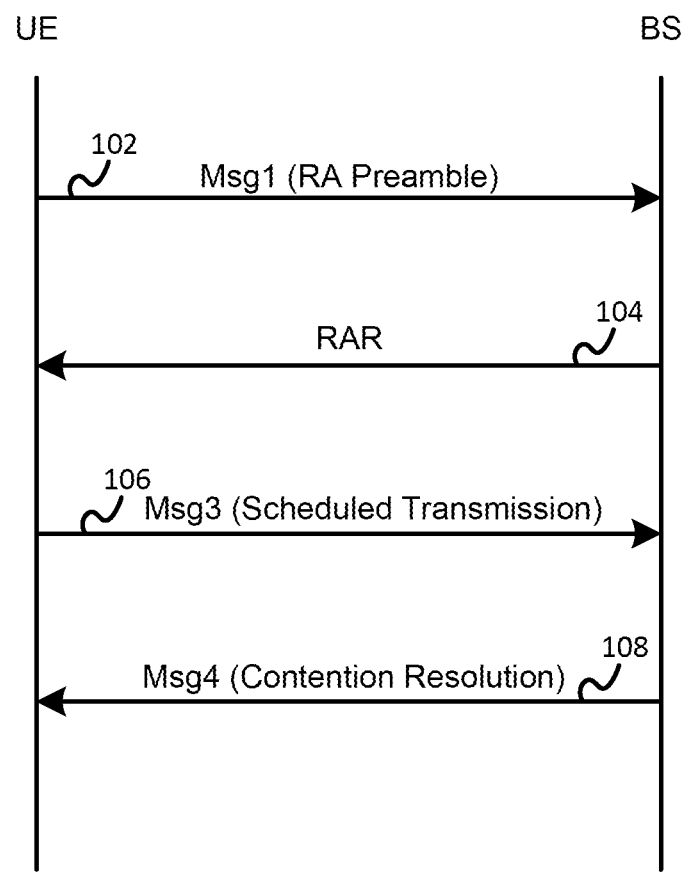
FIG. 1 is a sequence diagram illustrating a CBRA procedure according to an implementation of the present disclosure.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in some implementations" or "In some implementations" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details, such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or one or more Digital Signal Processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network, such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT), such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

The terms, definitions, and abbreviations as given in this document are either imported from existing documentation (European Telecommunications Standards Institute (ETSI), International Telecommunication Union (ITU), or elsewhere) or newly created by 3GPP experts whenever the need for precise vocabulary is identified.

Examples of some selected terms are provided as follows.

Cell: Radio network object that can be uniquely identified by a User Equipment from a (cell) identification that is broadcast over a geographical area from one UTRAN Access Point. A Cell is either FDD or TDD mode.

Serving Cell: For a UE in the RRC_CONNECTED state not configured with CA/DC, there is only one serving cell including the primary cell. For a UE in the RRC_CONNECTED state configured with CA/DC, the term 'serving cells' is used to denote the set of cells including the Special Cell(s) and all secondary cells.

CA: In Carrier Aggregation (CA), two or more Component Carriers (CCs) are aggregated. A UE may simultaneously receive or transmit on one or multiple CCs depending on its capabilities. CA is supported for both contiguous and non-contiguous CCs. When CA is deployed, frame timing and SFN are aligned across cells that can be aggregated. The maximum number of configured CCs for a UE is 16 for DL and 16 for UL. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). Depending on UE capabilities, Secondary Cells (SCells) can be configured to form together with the Pcell a set of serving cells. The configured set of serving cells for a UE therefore may always include one PCell and one or more SCells.

BWP: A subset of the total cell bandwidth of a cell is referred to as a Bandwidth Part (BWP) and Bandwidth Adaptation (BA) is achieved by configuring the UE with BWP(s) and telling the UE which of the configured BWPs is currently the active one. To enable BA on the Pcell, the gNB configures the UE with UL and DL BWP(s). To enable BA on Scells in case of CA, the gNB configures the UE with DL BWP(s) at least (e.g., there may be none in the UL). For the Pcell, the initial BWP is the BWP used for initial access. For the Scell(s), the initial BWP is the BWP configured for the UE to first operate at Scell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an Scell, the firstActiveUplinkBWP IE field contains the ID of the uplink bandwidth part to be used upon MAC-activation of an Scell.

PDCCH: In the downlink, the gNB can dynamically allocate resources to UEs at least via the C-RNTI/MCS-C-RNTI/CS-RNTI on PDCCH(s). A UE always monitors the PDCCH(s) in order to find possible assignments when its downlink reception is enabled (activity governed by DRX when configured). When CA is configured, the same C-RNTI applies to all serving cells. In NR wireless communication systems, a downlink data reception at the UE side is achieved by monitoring the PDCCH and finding a possible assignment. The assignment may be represented as a (UE-specific) DCI. The DCI may be found on the PDCCH via blind decoding. From the implementation of the blind decoding aspect, the UE may be configured with a set of PDCCH candidates within one or more CORESETs. The PDCCH candidate set for the UE to monitor is defined in terms of PDCCH search space sets (or search space sets). A search space set can be categorized into two types (e.g., a Common Search space (CSS) set or a UE-Specific Search Space (USS) set). That is, a UE monitors PDCCH candidates according to one or more configured search spaces sets to decode a possible PDCCH transmitted by the gNB. In other words, a PDCCH may be found in the PDCCH candidates within the monitored search space sets. More specifically, in some implementations, the UE monitors a set of PDCCH candidates in one or more CORESETs and/or Search Spaces on a DL BWP (e.g., the active DL BWP on each activated serving cell or the initial BWP on a camped cell) configured with PDCCH monitoring according to corresponding search space sets where the monitoring implies decoding each PDCCH candidate according to the monitored DCI formats. That is, the DCI with CRC bits scrambled by a UE-specific RNTI (e.g., C-RNTI) is carried by the PDCCH, and the DCI is found by the UE descrambling the CRC bits with the RNTI.

PDSCH/PUSCH: The PDCCH can be used to schedule DL transmissions on a PDSCH and UL transmissions on a PUSCH.

Beam: A beam may refer to a spatial (domain) filtering. In one example, the spatial filtering is applied in analog domain by adjusting a phase and/or amplitude of the signal before being transmitted by a corresponding antenna element. In another example, the spatial filtering is applied in digital domain by Multi-Input Multi-Output (MIMO) techniques in a wireless communication system. For example, "a UE made a PUSCH transmission by using a specific beam" means the UE made the PUSCH transmission by using the specific spatial/digital domain filter. The "beam" may also be, but is not limited to be, represented as an antenna, an antenna port, an antenna element, a group of antennas, a group of antenna ports, or a group of antenna elements. The beam may also be formed by a certain reference signal resource. In brief, the beam can be equivalent to a spatial domain filter through which the EM wave is radiated.

A specific configuration configured for a UL BWP or a BWP may refer to a UL BWP configuration (e.g., the IE BWP-Uplink), a dedicated UL BWP configuration (e.g., the IE BWP-UplinkDedicated), a common UL BWP configuration (e.g., the IE BWP-UplinkCommon), a common PUSCH configuration (e.g., the IE PUSCH-ConfigCommon), or a PUSCH configuration (e.g., the IE PUSCH-Config).

NR technology has been developed by 3GPP for 5G mobile networks. In NR, the RA procedure has been designed to handle various scenarios, such as initial access, handover, and timing synchronization. There are two types of RA procedures in NR: 4-step RA and 2-step RA. The 4-step RA procedure supports both CBRA and CFRA.

FIG. 1 is a sequence diagram illustrating a CBRA procedure according to an implementation of the present disclosure. As illustrated in FIG. 1, the CBRA procedure includes actions 102, 104, 106 and 108. In action 102 (or in a round of an RA preamble transmission step/stage), a UE may transmit a Msg1 to a BS (e.g., gNB) via a configured resource (e.g., a PRACH). Then, the UE may monitor an RAR (or a Msg2) that corresponds to the Msg1 from the BS within a configured time window. The RAR may be transmitted by the BS on a PDSCH. As illustrated in action 104, the BS may transmit an RAR to the UE in response to receiving the Msg1 from the UE. In action 106 (or in a round of a Msg3 transmission step/stage), after receiving the RAR, the UE may transmit a Msg3 to the BS in a scheduled transmission (e.g., scheduled by the RAR) on a PUSCH, by using a UL grant/resource provided/indicated by the RAR. The Msg3 may be an RRC message. In action 108, the UE may receive a Msg4 (e.g., containing a specific MAC CE referred to as a UE Contention Resolution Identity) from the BS. The UE may determine whether a contention resolution is successful according to the UE Contention Resolution Identity. If the contention resolution is successful, the CBRA procedure ends. If the contention resolution is not successful after one or more Msg3 (re)transmissions, the CBRA procedure may go back to action 102, in which the UE may perform the Msg1 transmission again.

Figure 2:
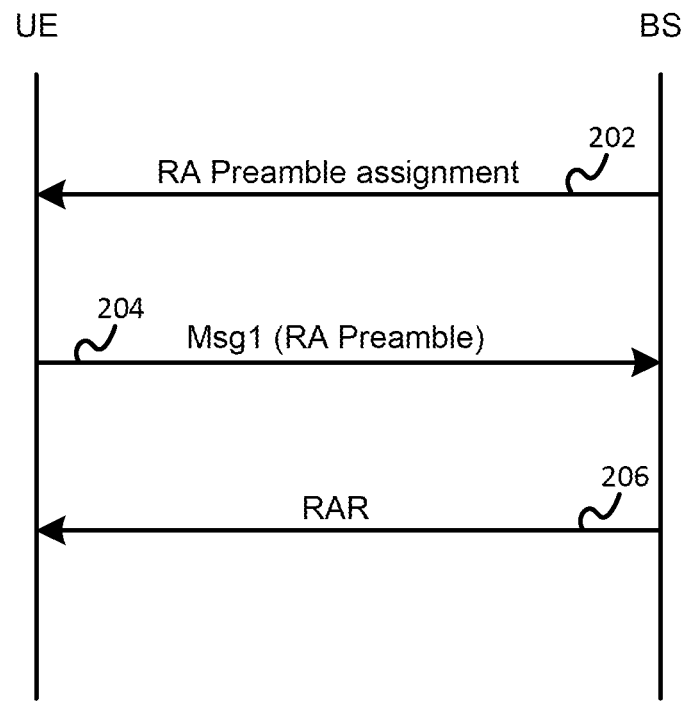
FIG. 2 is a sequence diagram illustrating a CFRA procedure in accordance with an implementation of the present disclosure.

FIG. 2 is a sequence diagram illustrating a CFRA procedure in accordance with an implementation of the present disclosure. As illustrated in FIG. 2, a UE may receive an RA preamble assignment from a BS in action 202. The RA preamble assignment may indicate a resource allocation of an RA preamble transmission. In action 204, the UE may transmit a Msg1 (e.g., including an RA preamble) according to the indicated resource allocation. In action 206, if the UE receives an RAR as a response to the Msg1, from the BS, the CFRA procedure ends.

It is observed that some channels, other than PUSCH and PUCCH, may have coverage problems. For example, during an RA procedure, physical channels such as the PRACH and the Msg3 PUSCH can become a limiting factor due to weak coverage. To address this issue, improvements to UL repetitions, such as Multiple PRACH transmissions (MP) and Msg3 repetitions (M3R), are introduced.

Figure 3:
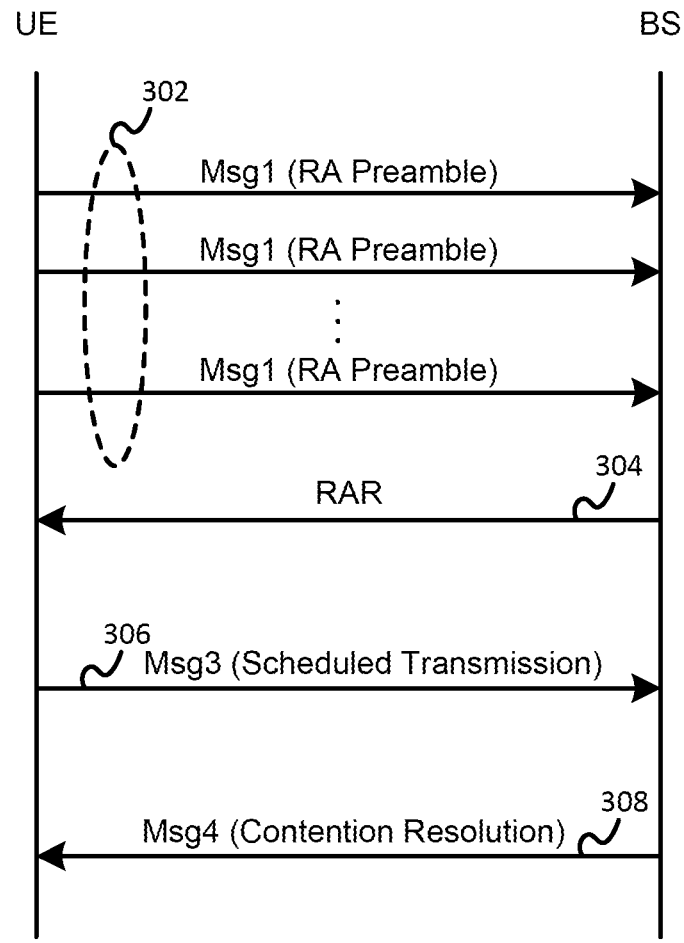
FIG. 3 is a sequence diagram illustrating an RA procedure with MP, according to an implementation of the present disclosure.

The mechanism of MP can enhance the performance of Msg1 transmission in an RA procedure. FIG. 3 is a sequence diagram illustrating an RA procedure with MP, according to an implementation of the present disclosure. As illustrated in FIG. 3, in action 302, the MP may include a UE transmitting a Msg1 multiple times (with the same or different beams) on a PRACH resource to a BS. Action 302 may be considered as being performed in (a round of) an RA preamble transmission step/stage of an RA procedure and before the UE begins monitoring for an RAR corresponding to the transmitted Msg1/RA preamble within a configured time window.

After action 302, the UE may then begin monitoring an RAR within a configured time window to see if an RAR corresponding to the transmitted Msg1 has been received. The configured time window may be determined by a timer. For example, once the timer starts, the configured time window begins; once the timer stops or expires, the configured time window ends. If the UE does not receive the corresponding RAR (e.g., indicating an RA preamble identity associated with the transmitted RA preamble/Msg1) within the configured time window, the UE may perform the next round of the RA preamble transmission step/stage. That is, the UE may perform action 302 again.

In action 304, the BS may transmit an RAR to the UE in response to receiving the Msg1 from the UE. In action 306 (or in a round of a Msg3 transmission step/stage), after receiving the RAR, the UE may transmit a Msg3 to the BS in a scheduled transmission (e.g., scheduled by the RAR) by using a UL grant provided by the RAR. The UE then monitors for contention resolution from the BS. In action 308, the UE may receive a Msg4 (e.g., contention resolution) from the BS. If the contention resolution is successful, the RA procedure ends.

The mechanism of M3R can achieve widespread coverage by allowing repetition of Msg3 transmission. For example, if the UE is in poor coverage, the UE may repeat the Msg3 transmission multiple times to increase the chance of successful decoding by the BS (e.g., gNB). Additionally, the use of M3R can lower latency compared to retransmitting Msg3 and can also prevent the risk of missed DCI detection and reduce PDCCH overhead.

Figure 4:
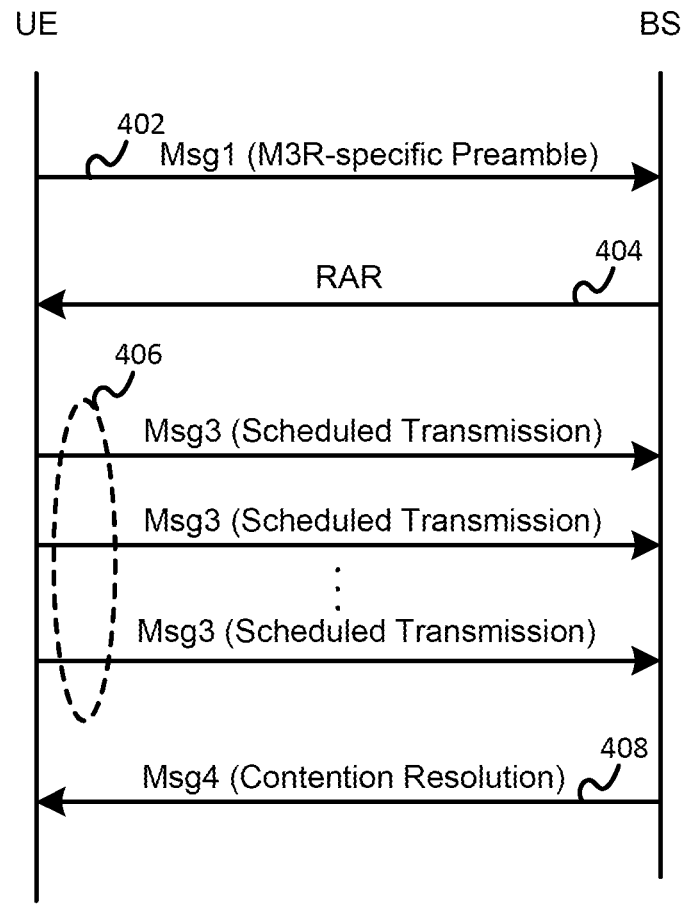
FIG. 4 is a sequence diagram illustrating an RA procedure with M3R, according to an implementation of the present disclosure.

FIG. 4 is a sequence diagram illustrating an RA procedure with M3R, according to an implementation of the present disclosure. As illustrated in FIG. 4, in action 402, a UE may transmit a Msg1 to a BS, where the Msg1 may include an M3R-specific preamble that requests M3R. The M3R-specific preamble may refer to a Msg3 repetition request in the present disclosure. That is, the terms "M3R-specific preamble" and "Msg3 repetition request" can be used interchangeably in the present disclosure.

The UE may then begin monitoring an RAR within a configured time window to see if an RAR corresponding to the transmitted Msg1 has been received. If the UE does not receive the corresponding RAR (e.g., indicating an RA preamble identity associated with the transmitted RA preamble/Msg1 in action 402) within the configured time window, the UE may perform action 402 again.

In action 404, the BS may transmit to the UE an RAR. In action 406 (or in a round of a Msg3 transmission step/stage), if the received RAR corresponds to the Msg1 transmitted in action 402 and the BS allows the UE to perform M3R, the UE may transmit a Msg3 to the BS multiple times by using a UL grant (e.g., PUSCH) scheduled by the RAR. The UE then monitors for contention resolution from the BS. In action 408, the UE may receive a Msg4 (e.g., contention resolution) from the BS. If the contention resolution is successful, the RA procedure ends.

In some implementations, action 402 may be implemented as MP (e.g., action 302 in FIG. 3) to increase the beam forming gain. That is, the UE may perform both MP and M3R for an RA procedure (e.g., for initial access), as illustrated in FIG. 5.

Figure 5:
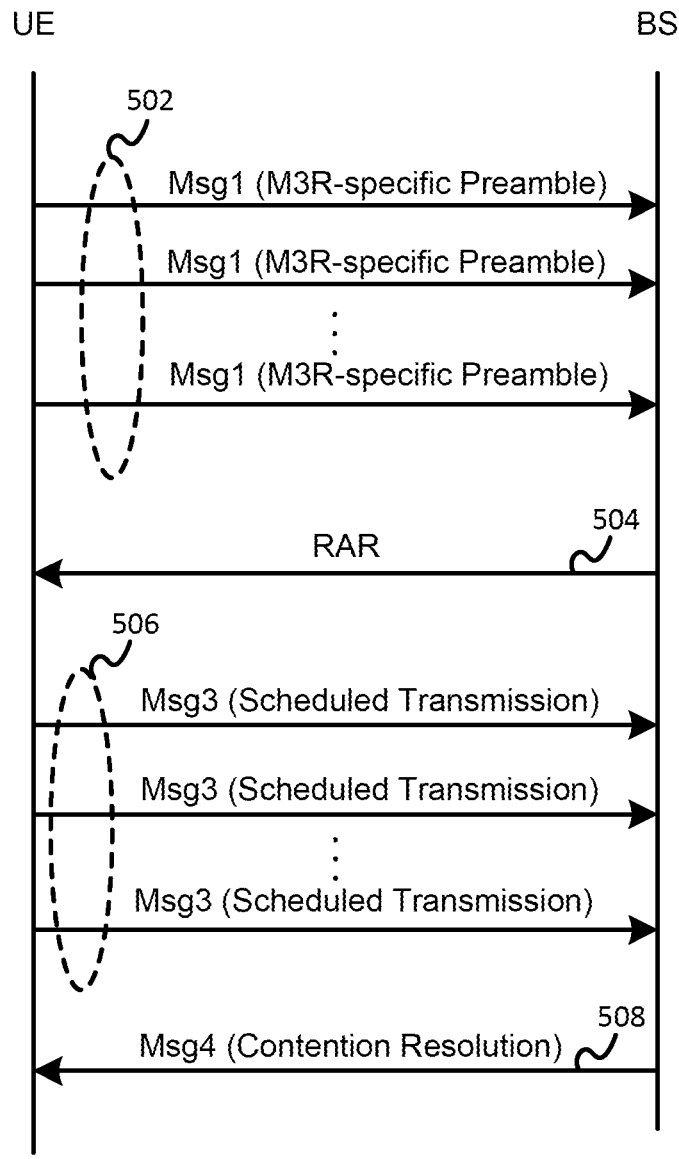
FIG. 5 is a sequence diagram illustrating an RA procedure with MP and M3R, according to an implementation of the present disclosure.

FIG. 5 is a sequence diagram illustrating an RA procedure with MP and M3R, according to an implementation of the present disclosure. As illustrated in FIG. 5, in action 502, a UE performs MP by transmitting a Msg1 multiple times to a BS, where the Msg1 may include an M3R-specific preamble that requests M3R. The UE may then begin monitoring an RAR within a configured time window to see if an RAR corresponding to the transmitted Msg1 has been received. If the UE does not receive the corresponding RAR (e.g., indicating an RA preamble identity associated with the transmitted RA preamble/Msg1 in action 502) within the configured time window, the UE may perform action 502 again.

In action 504, the BS may transmit to the UE an RAR. In action 506 (or in a round of a Msg3 transmission step/stage), if the received RAR corresponds to the Msg1 transmitted in action 502 and the BS allows the UE to perform M3R, the UE may transmit a Msg3 to the BS multiple times by using a UL grant (e.g., PUSCH) scheduled by the RAR. The UE then monitors for contention resolution from the BS. In action 508, the UE may receive a Msg4 (e.g., contention resolution) from the BS. If the contention resolution is successful, the RA procedure ends.

In the present disclosure, MP may also refer to transmitting a Msg 1 on a PRACH multiple times in a round of a Msg1 transmission step/stage; M3R may refer to transmitting a Msg3 on a PUSCH multiple times in a round of a Msg3 transmission step/stage; non-M3R may refer to transmitting only a single Msg3 on a PUSCH in a round of a Msg3 transmission step/stage.

M3R determination: To support M3R in an RA procedure (e.g., triggered for initial access), the UE may transmit a request for M3R to the BS (e.g., gNB). The determination of whether to request M3R may be based on an RSRP comparison process. For example, in some implementations, the BS may configure the UE with specific RA resource(s) for an RA that requires M3R, and an M3R-specific RSRP threshold (which is referred to as M3R-RSRP-Threshold in the present disclosure) through RRC message signaling (e.g., SIB1). The specific RA resource(s) may be configured for each BWP or configured on a per-BWP basis. After the RA procedure is initiated, the UE may perform the RSRP comparison process by comparing the RSRP value of the downlink pathloss reference (e.g., a DMRS, a PTRS, an SSB with a SS-RSRP, or a CSI-RS) with the M3R-RSRP-Threshold. If the RSRP value of the downlink pathloss reference is less than or equal to the M3R-RSRP-Threshold, the UE may assume that M3R is applicable to the initiated RA procedure. In such a case, the UE may then select the specific RA resource configured for an RA requiring M3R to transmit an M3R-specific (RA) preamble to request M3R. The BS may then determine whether to allow the UE to perform M3R after receiving the request for M3R from the UE (e.g., the M3R-specific (RA) preamble). The abovementioned procedure of a UE determining whether to request M3R is referred to as M3R determination in the present disclosure.

MP determination: To support MP, in some implementations, the UE may be configured by the BS (e.g., gNB) with specific RA resource(s) for an RA requiring MP and an MP-specific RSRP threshold (which is referred to as MP-RSRP-Threshold in the present disclosure) via RRC signaling (e.g., SIB1). The specific RA resource(s) may be configured for each BWP or configured on a per-BWP basis. During an RA procedure (e.g., triggered for initial access), the UE may perform an RSRP comparison process by comparing the RSRP value of the downlink pathloss reference (e.g., a DMRS, a PTRS, an SSB with SS-RSRP, or a CSI-RS) with the MP-RSRP-Threshold. If the RSRP value is less than or equal to the MP-RSRP-Threshold, the UE may consider MP to be applicable for the initiated RA procedure. The UE may then select the specific RA resource configured for an RA requiring MP to perform MP. The above mentioned procedure of a UE determining whether to perform MP is referred to as MP determination in the present disclosure.

As mentioned above, a UE may determine whether MP and M3R are applicable to an initiated RA procedure by performing M3R determination and MP determination. In such a case, the UE may perform two RSRP comparison processes, one with the MP-RSRP-Threshold and the other with the M3R-RSRP-Threshold. That is, the result of the MP determination may not be influenced by the result of the M3R determination and vice versa. However, having separate procedures may increase implementation complexity, leading to higher power consumption.

From a coverage enhancement perspective, the coverage of Msg3 may be impacted by the beam used for Msg1 transmission. In other words, the relationship between the coverage of Msg1 and Msg3 can be taken into account together. Hence, an efficient solution for handling the repetition of Msg3 may depend on how Msg1 transmission is carried out and vice versa. To address this concern, it could be advantageous to jointly determine MP and M3R if certain conditions are met. For example, the UE may perform a single procedure to determine the applicability of MP and M3R to the initiated RA procedure. If MP and M3R are applicable to the initiated RA procedure, the UE may (attempt to) select the specific RA resource(s) for an RA that requires MP and M3R, and then transmit the M3R-specific preamble on a PRACH multiple times. The M3R-specific preamble may be an RA preamble (or Msg1) that requests M3R.

For simplicity, in the present disclosure, a specific RA resource for an (initiated) RA requiring M3R may be referred to as an "M3R RA resource"; a specific RA resource for an (initiated) RA requiring MP may be referred to as an "MP RA resource"; a specific RA resource for an (initiated) RA requiring both MP and M3R may be referred to as an "MP+M3R RA resource"; a specific RA resource for an (initiated) RA not requiring either MP or M3R may be referred to as a "legacy RA resource."

Figure 6:
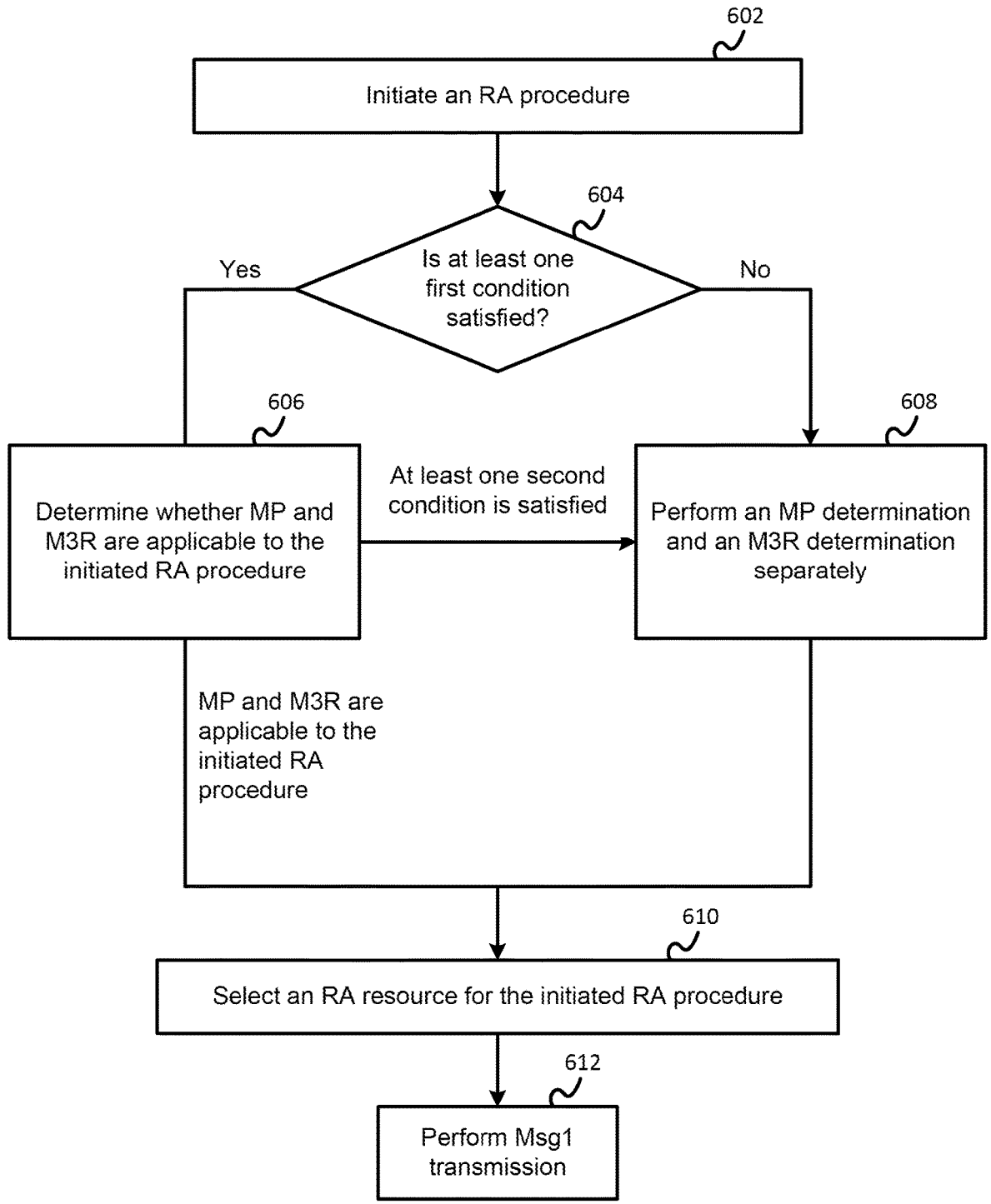
FIG. 6 is a flowchart illustrating a procedure of determining whether MP and M3R are applicable to an RA procedure, according to an implementation of the present disclosure.

To address the issue of interaction between MP and M3R determination, the UE may determine the applicability of MP and M3R based on the satisfaction of specific conditions, as illustrated in FIG. 6.

FIG. 6 is a flowchart illustrating a procedure of determining whether MP and M3R are applicable to an RA procedure, according to an implementation of the present disclosure. In action 602, the UE may initiate an RA procedure (e.g., triggered by the initial access). Then in action 604, the UE may determine whether at least one first condition is satisfied. In a case that the at least one first condition is met, then in action 606, the UE may determine whether MP and M3R are (concurrently) applicable to the initiated RA procedure. In action 608, in a case that the at least one first condition is not met, the UE may perform the MP determination and the M3R determination separately. After action 606, in a case that the UE determines that at least one second condition is satisfied, the UE may then perform action 608. Once the applicability of MP and M3R to the initiated RA procedure is determined, then in action 610, the UE may select an RA resource for the initiated RA procedure. The RA resource may be a legacy RA resource or a specific RA resource for an RA requiring MP and/or M3R, depending on the determination outcome of actions 606 and 608. Then in action 612, the UE may perform Msg1 transmission using the selected RA resource.

To support MP and M3R for the initiated RA procedure (e.g., triggered by initial access), the UE may be configured by the BS (e.g., gNB) with different types of RA resources in the initial BWP, including the legacy RA resource(s), M3R RA resource(s), MP RA resource(s), and/or MP+M3R RA resource(s). That is, the RA resources may be configured by the BS per BWP. Additionally, the UE may be configured by the BS with multiple RSRP thresholds to determine whether MP, M3R, or both MP and M3R are applicable to the initiated RA. In the present disclosure, the term "MP being applicable to the initiated RA procedure" may refer to allowing the UE to perform MP for the initiated RA procedure; the term "M3R being applicable to the initiated RA procedure" may refer to allowing the UE to request M3R for the initiated RA procedure; the term "both MP and M3R being applicable to the initiated RA procedure" may refer to allowing the UE to request M3R for the initiated RA procedure by performing MP.

Based on the granularity of RSRP thresholds configured for MP determination and M3R determination, several cases are introduced for the determination of whether MP and M3R are applicable. For example, the case where the RSRP thresholds (e.g., MP-RSRP-Threshold and M3R-RSRP-Threshold) are configured per BWP and the case where the RSRP thresholds are configured per RA resource (e.g., per RA configuration) are discussed.

Performing Determination of Whether MP and M3R are Applicable in the Case Where RSRP Thresholds are Configured per BWP In some implementations, to support MP and M3R, the UE may be configured by the BS (e.g., gNB) with the MP-RSRP-Threshold and the M3R-RSRP-Threshold. The UE may use the MP-RSRP-Threshold to determine whether MP is applicable to the initiated RA procedure and use the M3R-RSRP-Threshold to determine whether M3R is applicable to the initiated RA procedure. The MP-RSRP-Threshold may be configured in a case that both MP RA resource(s) and legacy RA resource(s) are available in the selected BWP. The M3R-RSRP-Threshold may be configured if both M3R RA resource(s) and legacy RA resource(s) are available in the selected BWP. In a case that both of the MP-RSRP-Threshold and the M3R-RSRP-Threshold are configured, the values of the MP-RSRP-Threshold and the M3R-RSRP-Threshold may be set based on the usage of the RA resource(s). For example, in a case that the value of the MP-RSRP-Threshold is lower than the value of the M3R-RSRP-Threshold, the MP RA resource may be used by the UE to signal the need for M3R (Msg3 repetition); in a case that the value of the MP-RSRP-Threshold is greater than the value of the M3R-RSRP-Threshold, the MP RA resource may not be used for signaling the need for M3R. In some implementations, in a case that the MP RA resource is explicitly or implicitly configured to also indicate the need for M3R, the MP RA resource may be considered as an MP+M3R RA resource.

As mentioned above, the BS may configure the UE with MP-RSRP-Threshold and/or M3R-RSRP-Threshold on a per-BWP basis. In some implementations, once an RA procedure (e.g., triggered by initial access) is initiated, if MP-RSRP-Threshold and M3R-RSRP-Threshold are configured, the UE may perform an RSRP comparison process using the configured RSRP threshold accordingly. For example, the UE may perform the MP determination and the M3R determination separately (e.g., as illustrated in action 608 of FIG. 6). In a case that the RSRP value of the downlink pathloss reference is less than or equal to the MP-RSRP-Threshold, the UE may consider MP to be applicable to the initiated RA; in a case that the RSRP value of the downlink pathloss reference is greater than the MP-RSRP-Threshold, the UE may consider that MP is not applicable to the initiated RA. Similarly, in a case that the RSRP value of the downlink pathloss reference is less than or equal to the M3R-RSRP-Threshold, the UE may consider M3R to be applicable to the initiated RA procedure; in a case that the RSRP value of the downlink pathloss reference is greater than the M3R-RSRP-Threshold, the UE may consider that M3R is not applicable to the initiated RA. The UE may determine whether MP and M3R are applicable to the initiated RA procedure by performing the MP determination and the M3R determination separately. After the UE determines whether MP and M3R are applicable to the initiated RA, the UE may select an RA resource to perform the RA procedure (e.g., as illustrated in action 610 of FIG. 6). For example, if MP and M3R are applicable and the UE is configured with the MP+M3R RA resource(s), the UE may select the MP+M3R RA resource to perform the initiated RA procedure.

In some implementations, the UE may determine whether MP and M3R are concurrently applicable to the initiated RA procedure (e.g., action 606 in FIG. 6) based on whether the UE has been configured by the BS with the MP-RSRP-Threshold and/or the M3R-RSRP-Threshold, as shown in Table 1. Once the applicability of MP and M3R has been determined, the UE may proceed to select an RA resource to perform the initiated RA procedure (e.g., action 610 in FIG. 6).

TABLE 1

| | Is MP-RSRP-Threshold configured? | Is M3R-RSRP-Threshold configured? |
|---|---|---|
| Case-T-Both | Yes | Yes |
| Case-T-MP | Yes | No |
| Case-T-M3R | No | Yes |
| Case-T-Other | Regardless of whether MP-RSRP-Threshold and M3R-RSRP-Threshold are configured | |

Case-T-Both (gNB-indicated-threshold-based Determination)

In some implementations, the BS may configure the UE with a 1-bit parameter indicating whether the MP-RSRP-Threshold or the M3R-RSRP-Threshold should be used for determining whether MP and M3R are applicable. This 1-bit parameter may be configured by the BS per BWP through RRC message signaling. For example, the BS may indicate the smaller one among the MP-RSRP-Threshold and the M3R-RSRP-Threshold as the threshold for determining whether MP and M3R are applicable. For example, once an RA procedure (e.g., triggered by initial access) is initiated, if Case-T-Both is met (e.g., both of the MP-RSRP-Threshold and the M3R-RSRP-Threshold are configured), and the 1-bit parameter and the MP+M3R RA resources are configured (e.g., the first condition(s) in action 604 of FIG. 6 is satisfied), the UE may compare the RSRP value of the downlink pathloss reference with the threshold indicated by the 1-bit parameter to determine whether MP and M3R are applicable to the initiated RA procedure (e.g., in action 606 in FIG. 6); otherwise, the UE may perform the MP determination and the M3R determination separately (action 608 in FIG. 6).

In some implementations, in action 606, the UE may consider MP and M3R to be applicable to the initiated RA procedure if the RSRP value of the downlink pathloss reference is less than or equal to the indicated threshold. In some implementations, if the RSRP value is greater than the indicated threshold, the UE may assume that neither MP nor M3R are applicable to the initiated RA procedure. In some implementations, if the RSRP value is greater than the indicated threshold, the UE may determine whether MP or M3R is applicable to the initiated RA procedure. For example, the UE may perform either the MP determination or the M3R determination according to the 1-bit parameter (e.g., in action 608 in FIG. 6). In a case that the 1-bit parameter indicates that the M3R-RSRP-Threshold is used for determining whether MP and M3R are (concurrently) applicable to the initiated RA procedure, the UE may perform the MP determination; in a case that the 1-bit parameter indicates that the MP-RSRP-Threshold is used for determining whether MP and M3R are (concurrently) applicable to the initiated RA procedure, the UE may perform the M3R determination.

After the UE determines whether MP and M3R are applicable to the initiated RA, the UE selects an RA resource to perform the RA.

Case-T-M3R (M3R-result-aligned Determination)

In some implementations, the outcome of the MP determination may be dependent on the result of the M3R determination, based on a Boolean parameter configured by the BS through RRC message signaling. For example, the M3R-RSRP-Threshold may be used to determine whether MP and M3R are applicable to the initiated RA procedure. Specifically, once an RA procedure is initiated, if the Case-T-M3R is met (e.g., the M3R-RSRP-Threshold is configured, but the MP-RSRP-Threshold is not), the Boolean parameter is set to true (e.g., the first condition(s) in action 604 of FIG. 6 is satisfied), and the MP RA resource (or MP+M3R RA resource) is configured, the UE may compare the RSRP value of the downlink pathloss reference with the M3R-RSRP-Threshold (e.g., in action 606 in FIG. 6) to determine whether MP and M3R are applicable to the initiated RA procedure; otherwise, the UE may perform the M3R determination according to the M3R-RSRP-Threshold (e.g., in action 608 in FIG. 6). In a case that the RSRP value of the downlink pathloss reference is less than or equal to the M3R-RSRP-Threshold, the UE may assume that both MP and M3R are applicable to the initiated RA procedure; otherwise, the UE may assume that both MP and M3R are not applicable to the initiated RA procedure.

After the UE determines whether MP and M3R are applicable to the initiated RA procedure, the UE may select an RA resource to perform the initiated RA procedure (e.g., in action 610 in FIG. 6).

Case-T-MP (MP-result-aligned Determination)

In some implementations, the outcome of the M3R determination may be dependent on the result of the MP determination, based on a Boolean parameter configured by the BS through RRC message signaling. For example, the MP-RSRP-Threshold may be used to determine whether MP and M3R are applicable to the initiated RA procedure. Specifically, once an RA procedure is initiated, if the Case-T-MP is met (e.g., the MP-RSRP-Threshold is configured, but the M3R-RSRP-Threshold is not), the Boolean parameter is set to true (e.g., the first condition(s) in action 604 of FIG. 6 is satisfied), and the MP RA resource (or MP+M3R RA resource) is configured, the UE may compare the RSRP value of the downlink pathloss reference with the MP-RSRP-Threshold (e.g., in action 606 in FIG. 6) to determine whether MP and M3R are applicable to the initiated RA procedure; otherwise, the UE may perform the MP determination according to the MP-RSRP-Threshold (e.g., in action 608 in FIG. 6). In a case that the RSRP value of the downlink pathloss reference is less than or equal to the MP-RSRP-Threshold, the UE may assume that both MP and M3R are applicable to the initiated RA procedure; otherwise, the UE may assume that both MP and M3R are not applicable to the initiated RA procedure.

After the UE determines whether MP and M3R are applicable to the initiated RA procedure, the UE may select an RA resource to perform the initiated RA procedure (e.g., in action 610 in FIG. 6).

Case-T-Other (Integrated-threshold-based Determination)

In the case of Case-T-Other, MP and M3R RA resources may or may not be configured in the selected BWP. In such a case (Case-T-Other), a mechanism of determining whether MP and M3R are applicable to an RA procedure may be applied in a case that MP+M3R RA resources are configured in the selected BWP.

For example, the UE may be configured by the BS with an integrated RSRP threshold (which is also referred to as Joint-RSRP-Threshold), to determine whether MP and M3R are applicable to an RA procedure. The Joint-RSRP-Threshold may be configured by the BS on a per-BWP basis. Once an RA procedure (e.g., triggered by initial access) is initiated, if the Joint-RSRP-Threshold is configured (e.g., the first condition(s) in action 604 of FIG. 6 is satisfied), the UE may perform the RSRP comparison process using the Joint-RSRP-Threshold (e.g., in action 606 in FIG. 6); otherwise, the UE may perform the MP determination and/or the M3R determination (e.g., in action 608 in FIG. 6) based on whether the MP-RSRP-Threshold and the M3R-RSRP-Threshold are configured. In a case that the RSRP value of the downlink pathloss reference is less than or equal to the Joint-RSRP-Threshold, the UE may assume that MP and M3R are applicable to the initiated RA; otherwise, the UE's behavior may be determined based on whether the MP-RSRP-Threshold or the M3R-RSRP-Threshold is configured, as shown below (UE's behaviors 1 and 2):

1. Regardless of whether MP-RSRP-Threshold and M3R-RSRP-Threshold are configured, the UE may assume that MP and M3R are not applicable to the initiated RA.
2. The UE may assume that both MP and M3R are not applicable to the initiated RA procedure in a case that none of the MP-RSRP-Threshold and the M3R-RSRP-Threshold is configured. In a case that either the MP-RSRP-Threshold or the M3R-RSRP-Threshold is configured in the selected BWP (e.g., the second condition(s) described in FIG. 6 is satisfied), the UE may perform a RSRP comparison process using the configured threshold. For example, the UE may compare the RSRP value of the downlink pathloss reference with the MP-RSRP-Threshold in a case that the MP-RSRP-Threshold is configured; the UE may compare the RSRP value of the downlink pathloss reference with the M3R-RSRP-Threshold in a case that the M3R-RSRP-Threshold is configured. In a case that both the MP-RSRP-Threshold and the M3R-RSRP-Threshold are configured, the UE may determine whether MP and M3R are applicable to an RA procedure based on the relative values of the MP-RSRP-Threshold, M3R-RSRP-Threshold, and Joint-RSRP-Threshold. For example, in a case that the Joint-RSRP-Threshold is greater than or equal to the maximum of MP-RSRP-Threshold and M3R-RSRP-Threshold, the UE may assume that both MP and M3R are not applicable to the RA procedure. In a case that the Joint-RSRP-Threshold is less than the minimum of the MP-RSRP-Threshold and the M3R-RSRP-Threshold (e.g., the second condition(s) described in FIG. 6 is satisfied), the UE may perform the MP determination and the M3R determination separately; otherwise, the UE may perform the RSRP comparison process using the threshold greater than the Joint-RSRP-Threshold to perform the MP determination or the M3R determination.

After the UE determines whether MP and M3R are applicable to the initiated RA procedure, the UE may select an RA resource to perform the RA procedure (e.g., in action 610 in FIG. 6).

RA Resource Selection

After the UE determines which one or ones of the transmission schemes (e.g., MP and M3R) are applicable to the initiated RA procedure, the UE may select an RA resource to perform the initiated RA procedure requiring the transmission scheme(s). The RA resource selection mechanisms described in the section may correspond to, or implement, action 610 in FIG. 6.

In some implementations, in a case that the UE determines that MP and M3R are not applicable to the initiated RA procedure, the UE may select a legacy RA resource for the initiated RA procedure. On the other hand, if MP and/or M3R are applicable to the initiated RA procedure, the UE may try to select a specific RA resource using at least one of the following approaches 1 and 2:

1. In some implementations, in a case that none of the specific RA resources is available for an RA procedure requiring all determined features (e.g., MP and/or M3R), the UE may select a legacy RA resource to perform the initiated RA procedure.
2. In some implementations, in a case that there is a specific RA resource available for an RA procedure requiring all determined features (e.g., MP and/or M3R), the UE may select a specific RA resource (configured for an RA procedure requiring MP and/or M3R) to perform the initiated RA procedure. In a case that there are multiple RA specific resources available for an RA procedure requiring only some of the determined features, and the UE may select one of the specific RA resources for the initiated RA procedure based on a priority order. In some implementations, the priority order may be indicated by the BS via RRC message signaling for each BWP.

Determination of Whether MP and M3R are Applicable to an RA Procedure in Cases Where RSRP Thresholds are Configured per RA Resource In some implementations, the RSRP thresholds for MP determination and M3R determination may be configured by the BS per RA-specific resource. For example, the UE may be configured by the BS with an M3R RA resource and a corresponding M3R-RSRP-Threshold. The UE may determine whether to select the M3R RA resource to perform an initiated RA procedure by performing an RSRP comparison process using the corresponding M3R-RSRP-Threshold.

Figure 7:
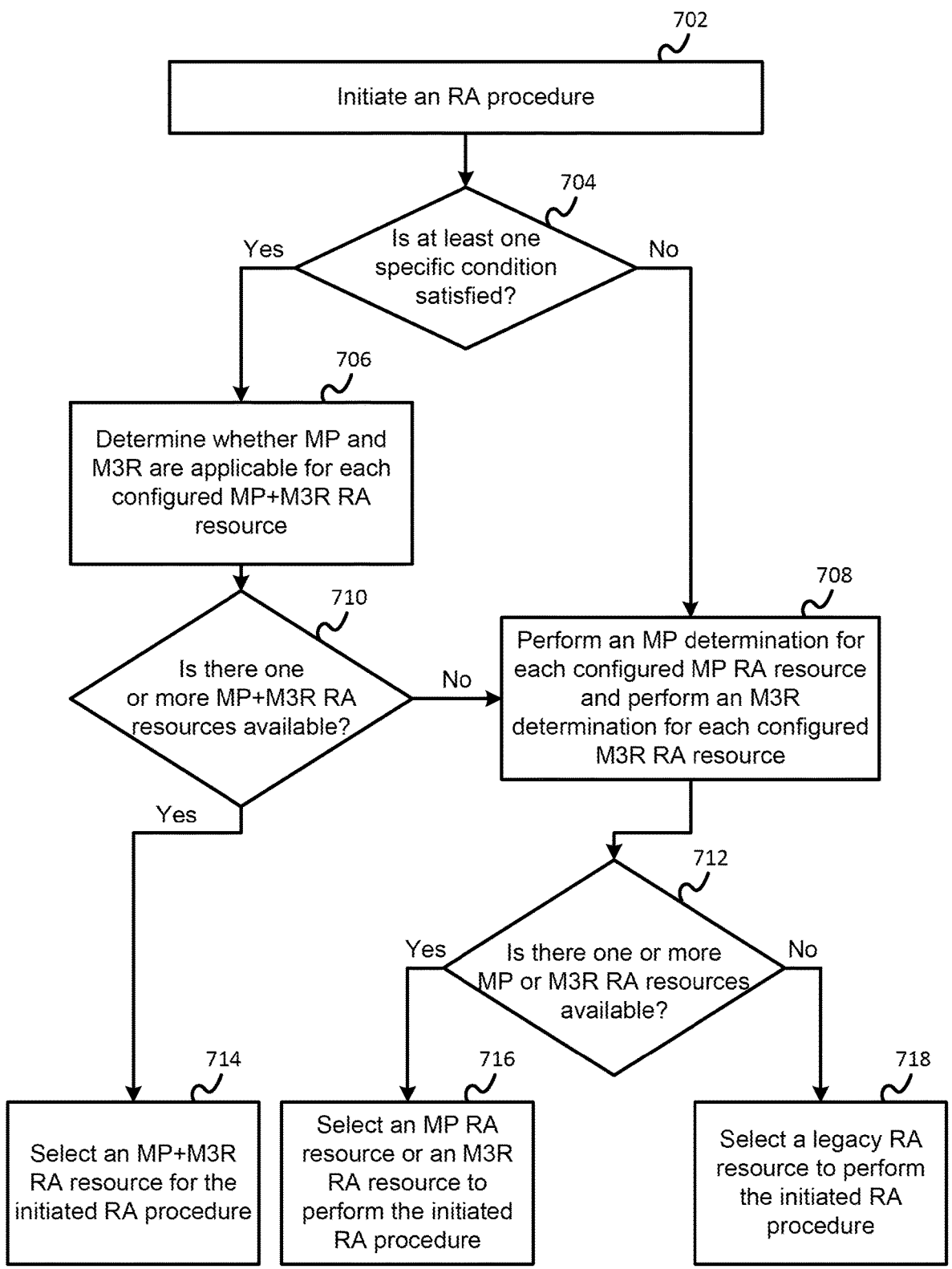
FIG. 7 is a flowchart illustrating a procedure of determining whether MP and M3R are applicable to an RA procedure in a case that RSRP thresholds are configured per RA resource, according to an implementation of the present disclosure.

FIG. 7 is a flowchart illustrating a procedure of determining whether MP and M3R are applicable to an RA procedure in a case that RSRP thresholds are configured per RA resource, according to an implementation of the present disclosure. As illustrated in FIG. 7, the UE may determine whether MP and M3R are applicable to an initiated RA procedure in a case that an MP+M3R RA resource and the corresponding specific RSRP threshold (e.g., Joint-RSRP-Threshold) are configured in the selected BWP. Specifically, once an RA procedure (e.g., triggered by initial access) is initiated (action 702), the UE may then determine whether at least one specific condition is satisfied (action 704) (e.g., whether the selected BWP is configured with MP+M3R RA resources and their corresponding Joint-RSRP-Thresholds). If the outcome of action 704 is yes, then in action 706, the UE may determine whether MP and M3R are applicable for each configured MP+M3R RA resource. For example, the UE may perform an RSRP comparison process using the corresponding Joint-RSRP-Threshold for each configured MP+M3R RA resource. For example, for an MP+M3R RA resource, if the RSRP value of the downlink pathloss reference is less than or equal to the corresponding Joint-RSRP-Threshold, the UE may determine that MP and M3R are applicable to the initiated RA procedure and the MP+M3R RA resource is available for the initiated RA procedure. In some implementations, there may be an MP+M3R RA resource configured for a RedCap UE, an MP+M3R RA resource configured for a UE triggering SDT RA, and some additional other MP+M3R RA resources configured for specific UEs. In some implementations, the UE may be configured by the gNB with MP+M3R RA resources, where each of the MP+M3R RA resources may be associated with an SSB. The UE may then determine whether one or more MP+M3R RA resources are available (action 710). In action 714, the UE may select an MP+M3R RA resource for the initiated RA procedure. For example, if there is only one MP+M3R RA resource available, the UE may select the MP+M3R RA resource to perform the initiated RA. For example, if there are one or more MP+M3R RA resources available, the UE may select an MP+M3R RA resource from all of the available MP+M3R RA resources based on a priority order, where the priority order may be indicated by the BS via RRC message signaling for each BWP. If there is no MP+M3R RA resource available, in action 708, the UE may further perform an MP determination for each MP RA resource and perform an M3R determination for each M3R RA resource.

For example, if the selected BWP is configured by the BS with an M3R RA resource and a corresponding M3R-RSRP-Threshold, the UE may perform an RSRP comparison process using the corresponding M3R-RSRP-Threshold (e.g., comparing the RSRP value of the downlink pathloss reference with the corresponding M3R-RSRP-Threshold). If the RSRP value of the downlink pathloss reference is less than or equal to the corresponding M3R-RSRP-Threshold, the UE may determine that M3R is applicable to the initiated RA procedure and the M3R RA resource is available for the initiated RA procedure. On the other hand, if the selection BWP selected is configured by the BS with an MP RA resource and a corresponding MP-RSRP-Threshold, the UE may perform an RSRP comparison process using the MP-RSRP-Threshold (e.g., comparing the RSRP value of the downlink pathloss reference with the corresponding MP-RSRP-Threshold). If the RSRP value of the downlink pathloss reference is less than or equal to the MP-RSRP-Threshold, the UE may determine that MP is applicable to the initiated RA procedure and the MP RA resource is available for the initiated RA procedure.

After performing action 708, the UE may determine whether one or more MP RA resources or M3R RA resources are available (action 712). In some implementations, if there is only an MP RA resource or only an M3R RA resource available, the UE may select the MP RA resource or the M3R RA resource to perform the initiated RA (action 716). In some implementations, if there are one or more MP RA resources and one or more M3R RA resources available, then in action 716, the UE may select an MP RA resource or an M3R RA resource from all of the available RA resources based on a priority order, where the priority order may be indicated by the BS via RRC message signaling for each BWP. If none of the MP RA resources and the M3R RA resources are available (e.g., the outcome of action 712 is no), the UE may select a legacy RA resource to perform the initiated RA (action 718).

Figure 8:
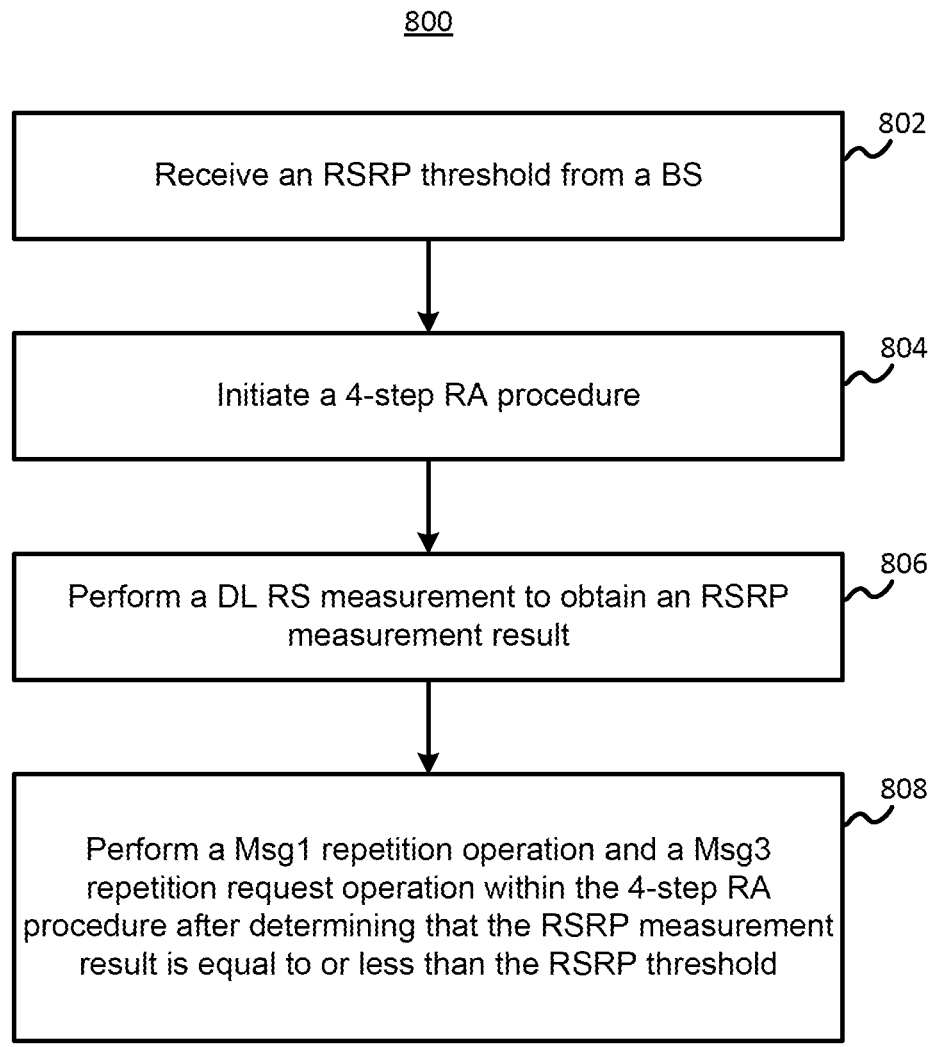
FIG. 8 is a flowchart of a method for performing uplink repetitions, according to an example implementation of the present disclosure.

FIG. 8 is a flowchart of a method 800 for performing uplink repetitions, according to an example implementation of the present disclosure. Although actions 802, 804, 806, and 808 are illustrated as separate actions represented as independent blocks in FIG. 8, these separately illustrated actions should not be construed as necessarily order-dependent. The order in which the actions are performed in FIG. 8 is not intended to be construed as a limitation, and any number of the disclosed blocks may be combined in any order to implement the method, or an alternate method. Each of actions 802, 804, 806, and 808 may be performed independently of other actions and can be omitted in some implementations of the present disclosure. Moreover, the method 800 can be combined with other procedures/methods described in the present disclosure.

In action 802, the UE may receive an RSRP threshold from a BS. In some implementations, the RSRP threshold may be an M3R-RSRP-Threshold. In some implementations, the RSRP threshold may be an MP-RSRP-Threshold. In some implementations, the RSRP threshold may be a Joint-RSRP-Threshold. In some implementations, the RSRP threshold may be implemented by reusing an existing RSRP threshold that has been defined in the 3GPP specification.

In action 804, the UE may initiate a 4-step RA procedure.

In action 806, the UE may perform a DL RS measurement to obtain an RSRP measurement result. For example, with the DL RS measurement, the UE may measure a downlink pathloss reference (e.g., a DMRS, a PTRS, an SSB with a SS-RSRP, or a CSI-RS) from the BS to obtain the corresponding RSRP measurement result (e.g., an RSRP value of the downlink pathloss reference).

In action 808, the UE may perform a Msg1 repetition operation and a Msg3 repetition request operation within the 4-step RA procedure, after the UE determines that the RSRP measurement result is equal to or less than the RSRP threshold. The Msg1 repetition operation may include the UE transmitting a Msg1 for the 4-step RA procedure multiple times before the UE monitors an RAR corresponding to the Msg1 (e.g., as illustrated in action 302 of FIG. 3 or in action 502 of FIG. 5). The Msg3 repetition request operation may include the UE transmitting a Msg3 repetition request (e.g., a M3R-specific preamble) to the BS to request execution of a Msg3 repetition operation (e.g., as illustrated in action 402 of FIG. 4 or in action 502 of FIG. 5). The Msg3 repetition operation may include the UE transmitting a Msg3 for the 4-step RA procedure multiple times in response to receiving the RAR (e.g., as illustrated in action 406 of FIG. 4 or in action 506 of FIG. 5).

In the present disclosure, the Msg1 repetition operation may also refer to the MP mechanism described above; the Msg3 repetition operation may also refer to the M3R mechanism described above. That is, the terms "Msg1 repetition operation" and "MP" are used interchangeably, while the terms "Msg3 repetition operation" and "M3R" are used interchangeably. According to action 808, the UE may determine whether both MP and M3R are applicable to the initiated 4-step RA procedure based on whether the RSRP measurement result is equal to or less than the RSRP threshold (e.g., as illustrated in action 606 of FIG. 6 or action 706 of FIG. 7). In a case that the RSRP measurement result is equal to or less than the RSRP threshold, the UE may determine that both MP and M3R are applicable to the initiated 4-step RA procedure. The UE may then perform MP and request M3R for the initiated 4-step RA procedure. As illustrated in FIG. 5, the UE may transmit a Msg1 including a M3R-specific preamble multiple times, where the M3R-specific preamble is an RA preamble that requests M3R. If the BS accepts the request from the UE, the UE is allowed to perform M3R (or Msg3 repetition operation) through the resource scheduled by RAR for the subsequent Msg3 transmission (e.g., as illustrated in action 506 of FIG. 5).

In some implementations, the method 800 may further include the UE receiving, from the BS, an indication that the UE is permitted to determine whether to perform both the Msg1 repetition operation and the Msg3 repetition request operation within the 4-step RA procedure according to a comparison of the RSRP threshold and the RSRP measurement result.

In some implementations, the RSRP threshold may be configured for the UE to determine whether to perform the Msg1 repetition operation. For example, the UE may use the RSRP threshold to determine whether the channel/signal condition is poor enough that the UE needs to initiate the Msg1 repetition operation (or MP) to ensure successful reception of Msg1 by the BS. The UE may perform the Msg1 repetition operation in a case that an RSRP value of a downlink pathloss reference is less than or equal to the RSRP threshold.

In some implementations, the RSRP threshold may be configured for the UE to determine whether to perform the Msg3 repetition request operation. For example, the UE may use the RSRP threshold to determine whether the channel/signal condition is poor enough that the UE needs to request the Msg3 repetition operation (or M3R) to ensure successful reception of Msg3 by the BS. The UE may perform the Msg3 repetition request operation to request M3R in a case that an RSRP value of a downlink pathloss reference is less than or equal to the RSRP threshold.

In some implementations, the RSRP threshold may be configured on a per-BWP basis.

In some implementations, the RSRP threshold may be configured on a per-RA-resource basis. For example, the RSRP threshold may be configured per RA resource. The RA resource may be an MP+M3R RA resource, an MP RA resource, an M3R RA resource, or a legacy RA resource.

In some implementations, the Msg3 repetition request is transmitted via the Msg1.

According to method 800, when the signal or channel quality is relatively poor, the UE will simultaneously perform MP and request M3R based on a single determination (e.g., single RSRP comparison process), reducing the additional signaling overhead and time spent on separately performing the MP determination and the M3R determination. Additionally, if the result of the single determination meets a specific condition (e.g., as illustrated in action 606 of FIG. 6 or action 706 of FIG. 7) and the BS further accepts the UE's request for M3R, the UE can perform both MP (or Msg1 repetition operation) and M3R (or Msg3 repetition operation) in a single RA procedure, which increases the chances of successful reception of Msg1 and Msg3 by the BS and improving the reliability of the RA procedure.

Figure 9:
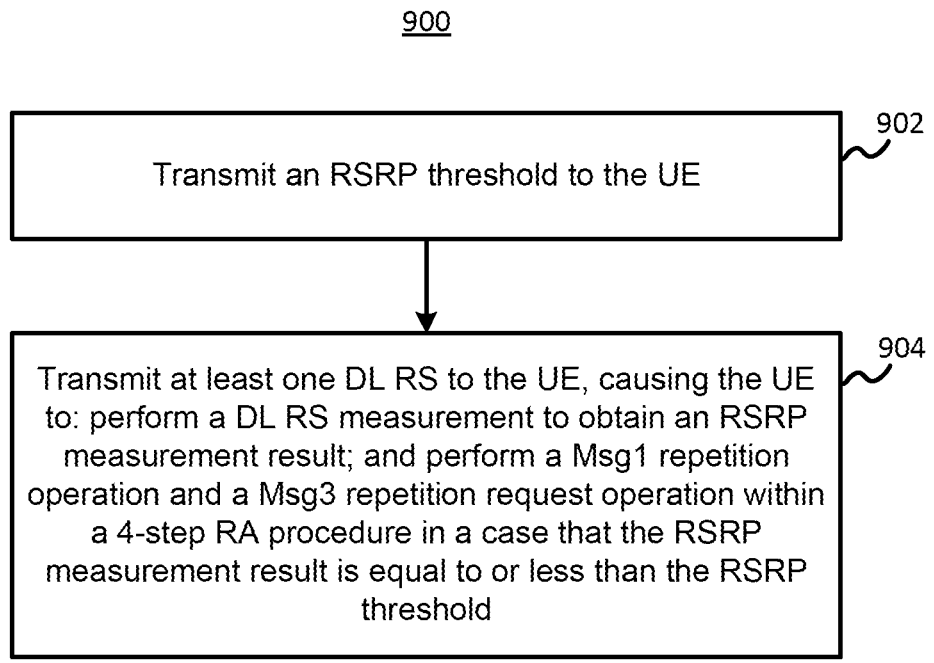
FIG. 9 is a flowchart of a method for communicating with a UE performing uplink repetitions, according to an example implementation of the present disclosure.

FIG. 9 is a flowchart of a method 900 for communicating with a UE performing uplink repetitions, according to an example implementation of the present disclosure. The method 900 can be combined with other procedures/methods described in the present disclosure. Moreover, the method 900 is a process executed from the perspective of the BS, and it can be considered as corresponding to the method 800 (in FIG. 8) which is executed from the perspective of the UE.

In action 902, a BS may transmit an RSRP threshold to the UE.

In action 904, the BS may transmit at least one DL RS to the UE, causing the UE to perform a DL RS measurement to obtain an RSRP measurement result, and causing the UE to perform a Msg1 repetition operation and a Msg3 repetition request operation within a 4-step RA procedure in a case that the RSRP measurement result is equal to or less than the RSRP threshold.

The DL RS may be a downlink pathloss reference, such as a DMRS, a PTRS, an SSB with a SS-RSRP, or a CSI-RS. The Msg1 repetition operation may include the UE transmitting a Msg1 for the 4-step RA procedure multiple times before the UE monitors an RAR corresponding to the Msg1 (e.g., as illustrated in action 302 of FIG. 3 or in action 502 of FIG. 5). The Msg3 repetition request operation may include the UE transmitting a Msg3 repetition request (e.g., a M3R-specific preamble) to the BS to request execution of a Msg3 repetition operation (e.g., as illustrated in action 402 of FIG. 4 or in action 502 of FIG. 5). The Msg3 repetition operation may include the UE transmitting a Msg3 for the 4-step RA procedure multiple times in response to receiving the RAR (e.g., as illustrated in action 406 of FIG. 4 or in action 506 of FIG. 5).

In some implementations, the BS may transmit, to the UE, an indication that the UE is permitted to determine whether to perform both the Msg1 repetition operation and the Msg3 repetition request operation within the 4-step RA procedure according to a comparison of the RSRP threshold and the RSRP measurement result.

In some implementations, the RSRP threshold may be configured for the UE to determine whether to perform the Msg1 repetition operation.

In some implementations, the RSRP threshold may be configured for the UE to determine whether to perform the Msg3 repetition request operation.

In some implementations, the RSRP threshold may be configured on a per-BWP basis.

In some implementations, the RSRP threshold may be configured on a per-RA-resource basis.

In some implementations, the BS may receive the Msg3 repetition request from the UE via the Msg1.

Figure 10:
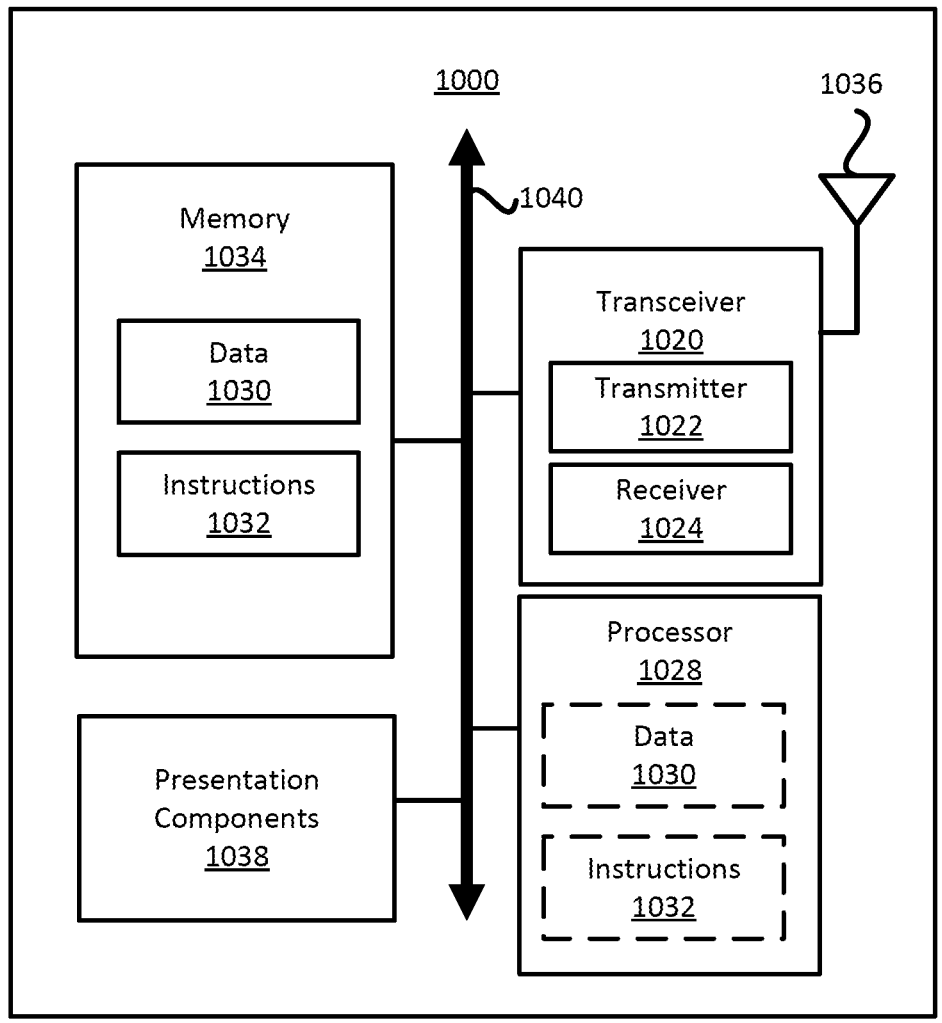
FIG. 10 is a block diagram illustrating a node for wireless communication, according to an example implementation of the present disclosure.

FIG. 10 is a block diagram illustrating a node 1000 for wireless communication, according to an example implementation of the present disclosure. As illustrated in FIG. 10, a node 1000 may include a transceiver 1020, a processor 1028, a memory 1034, one or more presentation components 1038, and at least one antenna 1036. The node 1000 may also include a radio frequency (RF) spectrum band module, a BS communications module, a network communications module, and a system communications management module, Input/Output (I/O) ports, I/O components, and a power supply (not illustrated in FIG. 10).

Each of the components may directly or indirectly communicate with each other over one or more buses 1040. The node 1000 may be a UE or a BS that performs various functions disclosed with reference to FIGS. 1 through 9.

The transceiver 1020 has a transmitter 1022 (e.g., transmitting/transmission circuitry) and a receiver 1024 (e.g., receiving/reception circuitry) and may be configured to transmit and/or receive time and/or frequency resource partitioning information. The transceiver 1020 may be configured to transmit in different types of subframes and slots including, but not limited to, usable, non-usable, and flexibly usable subframes and slot formats. The transceiver 1020 may be configured to receive data and control channels.

The node 1000 may include a variety of computer-readable media. Computer-readable media may be any available media that may be accessed by the node 1000 and include volatile (and/or non-volatile) media and removable (and/or non-removable) media.

The computer-readable media may include computer-storage media and communication media. Computer-storage media may include both volatile (and/or non-volatile media) and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 1034 may include computer-storage media in the form of volatile and/or non-volatile memory. The memory 1034 may be removable, non-removable, or a combination thereof. Example memory may include solid-state memory, hard drives, optical-disc drives, etc. As illustrated in FIG. 10, the memory 1034 may store a computer-readable and/or computer-executable instruction 1032 (e.g., software codes or program(s)) that are configured to, when executed, cause the processor 1028 to perform various functions disclosed herein, for example, with reference to FIGS. 1 through 9. Alternatively, the instruction 1032 may not be directly executable by the processor 1028 but may be configured to cause the node 1000 (e.g., when compiled and executed) to perform various functions disclosed herein.

The processor 1028 (e.g., having processing circuitry) may include an intelligent hardware device, e.g., a Central Processing Unit (CPU), a microcontroller, an ASIC, etc. The processor 1028 may include memory. The processor 1028 may process the data 1030 and the instruction 1032 received from the memory 1034, and information transmitted and received via the transceiver 1020, the baseband communications module, and/or the network communications module. The processor 1028 may also process information to send to the transceiver 1020 for transmission via the antenna 1036 to the network communications module for transmission to a Core Network (CN).

One or more presentation components 1038 may present data indications to a person or another device. Examples of presentation components 1038 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for performing uplink repetitions, the method comprising:
   receiving a Reference Signal Received Power (RSRP) threshold from a Base Station (BS);
   initiating a 4-step Random Access (RA) procedure;
   performing a Downlink (DL) Reference Signal (RS) measurement to obtain an RSRP measurement result; and
   performing a Message 1 (Msg1) repetition operation and a Message 3 (Msg3) repetition request operation within the 4-step RA procedure after determining that the RSRP measurement result is equal to or less than the RSRP threshold,
   wherein:
   the Msg1 repetition operation comprises transmitting a Msg1 for the 4-step RA procedure multiple times before the UE monitors a Random Access Response (RAR) corresponding to the Msg1, and
   the Msg3 repetition request operation comprises transmitting a Msg3 repetition request to the BS to request execution of a Msg3 repetition operation, the Msg3 repetition operation comprising:
   transmitting a Msg3 for the 4-step RA procedure multiple times in response to receiving the RAR.

2. The method of claim 1, further comprising:
   receiving, from the BS, an indication that the UE is permitted to determine whether to perform both the Msg1 repetition operation and the Msg3 repetition request operation within the 4-step RA procedure according to a comparison of the RSRP threshold and the RSRP measurement result.

3. The method of claim 1, wherein the RSRP threshold is configured for the UE to determine whether to perform the Msg1 repetition operation.

4. The method of claim 1, wherein the RSRP threshold is configured for the UE to determine whether to perform the Msg3 repetition request operation.

5. The method of claim 1, wherein the RSRP threshold is configured on a per-Bandwidth-Part (BWP) basis.

6. The method of claim 1, wherein the RSRP threshold is configured on a per-RA-resource basis.

7. The method of claim 1, wherein the Msg3 repetition request is transmitted via the Msg1.

8. A User Equipment (UE) for performing uplink repetitions, the UE comprising:
   at least one processor; and
   at least one memory coupled to the at least one processor, the at least one memory storing at least one computer-executable instruction that, when executed by the at least one processor, causes the UE to:
   receive a Reference Signal Received Power (RSRP) threshold from a Base Station (BS);
   initiate a 4-step Random Access (RA) procedure;
   perform a Downlink (DL) Reference Signal (RS) measurement to obtain an RSRP measurement result; and
   perform a Message 1 (Msg1) repetition operation and a Message 3 (Msg3) repetition request operation within the 4-step RA procedure after determining that the RSRP measurement result is equal to or less than the RSRP threshold,
   wherein:
   the Msg1 repetition operation comprises transmitting a Msg1 for the 4-step RA procedure multiple times before the UE monitors a Random Access Response (RAR) corresponding to the Msg1, and
   the Msg3 repetition request operation comprises transmitting a Msg3 repetition request to the BS to request execution of a Msg3 repetition operation, the Msg3 repetition operation comprising:
   transmitting a Msg3 for the 4-step RA procedure multiple times in response to receiving the RAR.

9. The UE of claim 8, wherein the at least one computer-executable instruction, when executed by the at least one processor, further causes the UE to:
   receive, from the BS, an indication that the UE is permitted to determine whether to perform both the Msg1 repetition operation and the Msg3 repetition request operation within the 4-step RA procedure according to a comparison of the RSRP threshold and the RSRP measurement result.

10. The UE of claim 8, wherein the RSRP threshold is configured for the UE to determine whether to perform the Msg1 repetition operation.

11. The UE of claim 8, wherein the RSRP threshold is configured for the UE to determine whether to perform the Msg3 repetition request operation.

12. The UE of claim 8, wherein the RSRP threshold is configured on a per-Bandwidth-Part (BWP) basis.

13. The UE of claim 8, wherein the RSRP threshold is configured on a per-RA-resource basis.

14. The UE of claim 8, wherein the Msg3 repetition request is transmitted via the Msg1.

15. A Base Station (BS) for communication with a User Equipment (UE) performing uplink repetitions, the BS comprising:
   at least one processor; and
   at least one memory coupled to the at least one processor, the at least one memory storing at least one computer-executable instruction that, when executed by the at least one processor, causes the BS to:
   transmit a Reference Signal Received Power (RSRP) threshold to the UE; and
   transmit at least one Downlink (DL) Reference Signal (RS) to the UE, causing the UE to:
      perform a DL RS measurement to obtain an RSRP measurement result; and
      perform a Message 1 (Msg1) repetition operation and a Message 3 (Msg3) repetition request operation within a 4-step Random Access (RA) procedure in a case that the RSRP measurement result is equal to or less than the RSRP threshold,
   wherein:
   the Msg1 repetition operation comprises the UE transmitting a Msg1 for the 4-step RA procedure multiple times before monitoring a Random Access Response (RAR) corresponding to the Msg 1, and
   the Msg3 repetition request operation comprises the UE transmitting a Msg3 repetition request to the BS to request execution of a Msg3 repetition operation, the Msg3 repetition operation comprising:
   the UE transmitting a Msg3 for the 4-step RA procedure multiple times in response to the UE receiving the RAR.

16. The BS of claim 15, wherein the at least one computer-executable instruction, when executed by the at least one processor, further causes the BS to:
   transmit, to the UE, an indication that the UE is permitted to determine whether to perform both the Msg1 repetition operation and the Msg3 repetition request operation within the 4-step RA procedure according to a comparison of the RSRP threshold and the RSRP measurement result.

17. The BS of claim 15, wherein the RSRP threshold is configured for the UE to determine whether to perform the Msg1 repetition operation.

18. The BS of claim 15, wherein the RSRP threshold is configured for the UE to determine whether to perform the Msg3 repetition request operation.

19. The BS of claim 15, wherein the RSRP threshold is configured on a per-Bandwidth-Part (BWP) basis.

20. The BS of claim 15, wherein the RSRP threshold is configured on a per-RA-resource basis.

21. The BS of claim 15, wherein the at least one computer-executable instruction, when executed by the at least one processor, further causes the BS to:
   receive the Msg3 repetition request from the UE via the Msg1.

* * * * *